F. PASTOR.
AUTOMOBILE LAMP SIGNAL.
APPLICATION FILED JAN. 26, 1914.
1,121,754.
Patented Dec. 22, 1914.
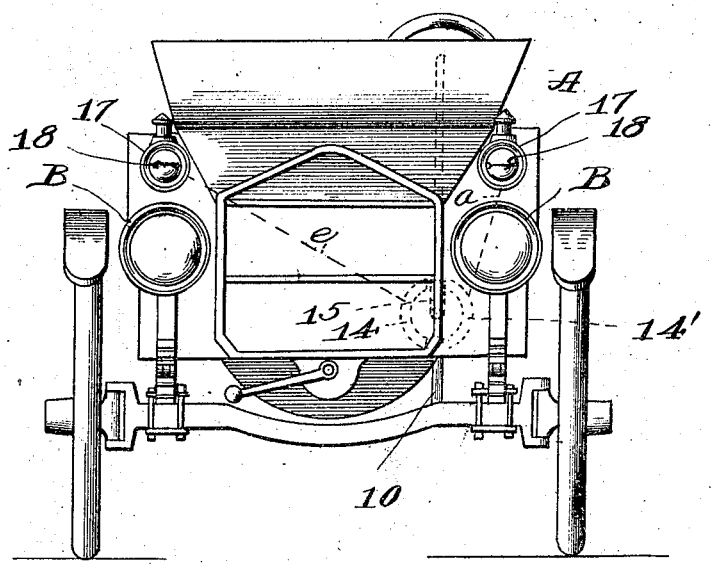
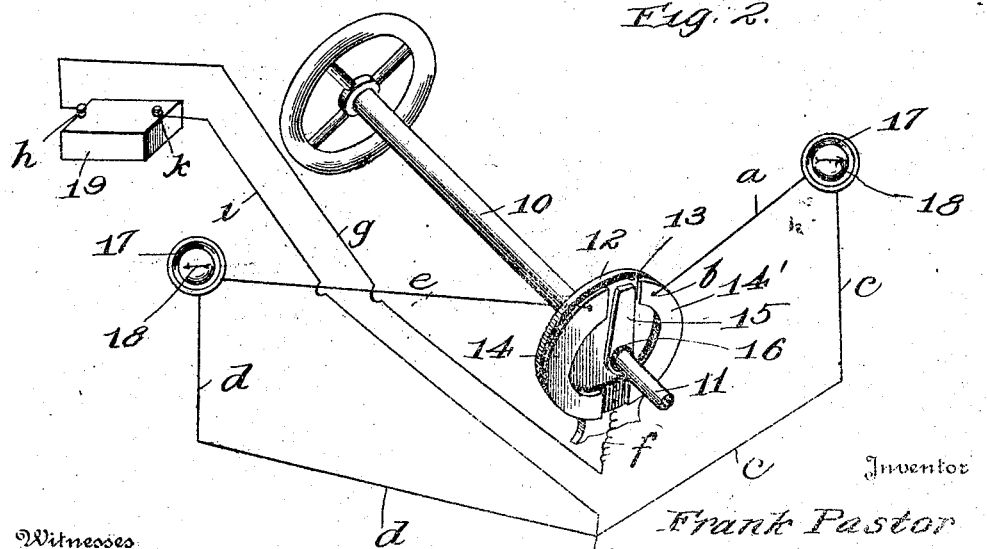

UNITED STATES PATENT OFFICE.

FRANK PASTOR, OF AKRON, OHIO.

AUTOMOBILE LAMP-SIGNAL.

1,121,754.

Specification of Letters Patent.　　Patented Dec. 22, 1914.

Application filed January 26, 1914. Serial No. 814,365.

*To all whom it may concern:*

Be it known that I, FRANK PASTOR, a subject of the Emperor of Austria and King of Hungary, residing at Akron, in the county of Summit and State of Ohio, have invented certain new and useful Improvements in Automobile Lamp-Signals, of which the following is a specification.

This invention relates to certain new and useful improvements in automobile lamp signals.

An object of the invention is to provide a lamp signal for automobiles that is intended to indicate to other drivers of vehicles and pedestrians of a change in direction of travel.

A further object of the invention is to control from the steering wheel of an automobile the electric circuits leading to the lamps disposed at each side of the vehicle so that the right hand lamp is lighted when the vehicle turns to the right and the left lamp is lighted when the vehicle turns to the left.

With the above and other objects in view that will appear as the nature of the invention is better understood, the same consists in the novel construction, combination and arrangement of parts to be hereinafter more fully described and then claimed, reference being had to the accompanying drawing by like characters denoting corresponding parts throughout the several views and wherein:

Figure 1 is a front elevational view of an automobile embodying my invention, and Fig. 2 is a developed perspective view of the electric circuits and switch for the lamps.

Referring more specifically to the drawing accompanying this application, the reference character A designates an automobile of the usual construction provided with the head lights B.

My invention consists in providing means operating in connection with the steering post of an automobile to selectively illuminate a lamp disposed at each side of the machine, as for instance when the machine is turned to the right the right hand lamp will be illuminated, and consists in providing on the lower end of the steering post 10 an extension or arm 11. The electrical means for causing the lamps to be illuminated is preferably disposed on the outer face of the front board of the automobile so that the same may be entirely hidden from view.

A plate 12 that is preferably circular in form is suitably secured to the outer face of the front board and extending through this plate 12 is the arm 11. The outer face of the plate 12 is provided with a suitable insulating disk 13 covering the entire outer face and mounted upon the insulating disk 13 are the contact segments 14 and 14'.

A switch tongue or finger 15 is carried by the arm 11 and insulated therefrom as at 16, the switch tongue 15 normally lying out of contact with the contact plates 14 and 14' when the machine is traveling in a straight forward direction.

Signal lamps 17 are carried by the automobile and are disposed rearwardly of the head lights B and in a plane above said head lights upon each side of the machine. Direction indicating arrows 18 are mounted upon the lens of the signal lamps 17, these direction indicating arrows being either painted upon said lenses or may be members that are detachable therefrom.

A suitable storage battery 19 is carried by the step or running board of the car and has circuit connections with the contact segments 14 and 14', switch tongue 15 and the signal lamps 17.

A circuit wire —a— is connected to the contact segment 14' as at —b— and continuous to the lamp 17 to the left side of the machine, from said lamp as at —c, d,— to the lamp at the right side of the machine and from said last named lamp as at —e— to the contact segment 14. A second circuit wire —f— is connected to the switch tongue 15 and continues as at —g— to the pole —h— of the battery 19. A third circuit wire —i— connected to the other pole —k— of the battery 19 is connected to the circuit wires —c— and —d— at the point —l—.

When the steering post 10 is turned to the left, the switch tongue 15 carried by the extension 11 is moved therewith and caused to engage the contact segment 14'. The lamp 17 at the left side of the machine is illuminated through the following of the circuit —a— from the said contact segment 14' to the lamp at the left side of the machine, continuing through the circuit wire —c— to the point —l—, thence continuing over the wire —i— to the pole —k— of the battery 19. The circuit is then completed through the wire —f— connected to the said switch tongue 15 and the circuit wire —g— to the pole —h— of the battery. At this time the lamp at the left side of the machine is illuminated while the circuit wires —d— and —e— and segment 14 are inactive. When the steering post 10 is moved to the right, the switch tongue 15 is moved in a corresponding direction and caused to engage the contact segment 14, the circuit being completed through the wires —e— to the lamp 17 at the right side of the machine, the wires —d— to the point —l— and thence over the wire —i— to the pole —k— of the battery 19, the wire —f— from the switch tongue 15 continuing as previously described over the wire —g— to the pole —h— of the battery.

It will be seen from the above description and operation of the device that I have provided an electric signal lamp for automobiles that is extremely simple in construction and thoroughly practical and which will perform in an efficient manner the objects expressed herein, and while I have shown and described the preferred embodiment of my invention, I do not wish to confine myself to such specific details of construction, as various forms, modifications and arrangements of the parts as shown may be had without departing from the spirit and scope of the invention as claimed.

I claim:—

An automobile signal controlling mechanism comprising a steering post, a circular plate through which said post extends, a circular insulating disk secured to the outer face of the plate, contact segments carried by the insulating disk and having their ends spaced apart, and a contact switch tongue fixed to the steering post and insulated therefrom.

In testimony whereof I affix my signature in presence of two witnesses.

FRANK PASTOR

Witnesses:
 TONY JANECHEK,
 GOSZT ZEMLA.